US00H002061H

(19) United States

(12) Statutory Invention Registration

Tunnell

(10) Reg. No.: US H2061 H

(43) Published: Apr. 1, 2003

(54) DEVICE, SYSTEM, AND METHOD FOR SECURING AN IRREGULARLY SHAPED DEVICE, INCLUDING THOSE WITH DISCONTINUOUS CONTOURS, IN A FIXTURE

(75) Inventor: Jeffery J. Tunnell, Ridgecrest, CA (US)

(73) Assignee: The United States of America as represented by the Secretary of the Navy, Washington, DC (US)

(21) Appl. No.: 09/613,064

(22) Filed: Jul. 11, 2000

(51) Int. Cl.[7] ..... B60P 7/12

(52) U.S. Cl. ..... 410/47; 410/44

(58) Field of Search ..... 410/47, 49, 50; 269/287

(56) References Cited

U.S. PATENT DOCUMENTS 2,006,451 A * 7/1935 Glidden
2,320,079 A * 5/1943 Hartwig
2,851,235 A * 9/1958 Henig
3,402,904 A * 9/1968 Paraskewik
3,521,875 A * 7/1970 Kapelsohn
3,868,101 A * 2/1975 Nozaki et al.
4,200,272 A 4/1980 Godding
4,218,051 A 8/1980 Stastny
5,904,347 A * 5/1999 Lin
5,975,512 A * 11/1999 Lin
5,988,618 A 11/1999 Meintrup et al.
6,032,348 A 3/2000 Hass et al.

* cited by examiner

*Primary Examiner*—Michael J. Carone
*Assistant Examiner*—M. Thomson
(74) *Attorney, Agent, or Firm*—Earl H. Baugher, Jr.; Laura R. Foster

(57) ABSTRACT

Provided is an apparatus, system, method of use, and method of manufacturing said apparatus, for securing an object having an irregular outer contour, including those objects having a discontinuous contour, in a standard fixture. While secured in the standard fixture modified as in a preferred embodiment of the present invention, a secured object can easily be accessed at any point as pre-determined by the user.

6 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DEVICE, SYSTEM, AND METHOD FOR SECURING AN IRREGULARLY SHAPED DEVICE, INCLUDING THOSE WITH DISCONTINUOUS CONTOURS, IN A FIXTURE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

A device for securing an irregularly-shaped object, including those objects having discontinuous contours, in a fixture, method of the device's use, and method of manufacture therefor.

BACKGROUND

A need for a means to secure irregularly shaped bulky objects, including those with discontinuous contours, in standard fixtures was summarized in the following criteria:

- Capable of securing an object having an irregular external cross-section, that is not necessarily continuous, along an axis suitable for rotation of the object
- Capable of fitting within overall outer dimension of existing fixture(s)
- Capable of supporting an object that weighs within limits designed to be held by existing fixture(s)
- Capable of permitting ready access to all areas of the object
- Capable of meeting safety proof testing requirements to support handling equipment safety certification procedures, as per NAWCWPNS Memorandum 84E000D/001, Jan. 2, 1997, incorporated by reference herein.

There exist fixtures for supporting irregularly-shaped objects, including those having discontinuous contours, as disclosed in U.S. Pat. No. 4,200,272, *Holder for Irregularly Shaped Articles,* issued to Godding, Apr. 29, 1980 and U.S. Pat. No. 5,988,618, *Work-Holding Device,* issued to Meintrup et al, Jul. 27, 1998. The fixtures provided in the '272 and '618 patents do not have a provision for easily rotating the object so that all areas of the object can be easily accessed. U.S. Pat. No. 4,218,051, *Workpiece Holding Fixture,* issued to Stastay, Aug. 19, 1980, does provide a means for rotating an irregularly shaped object. However, the fixture is specifically manufactured for that purpose and is not readily adaptable to existing tooling or commercially available fixtures. Further, modular adjustable holding fixtures, such as those produced by the method detailed in U.S. Pat. No. 6,032,348, *Method of Forming a Modularized Adjustable Holding Fixture,* issued to Haas et al, Mar. 7, 2000, do not provide the accessibility required to meet the above stated criteria nor are they readily adaptable to existing commercially available fixtures. A preferred embodiment of the present invention, however, meets all of the criteria while providing an inexpensive, readily attainable solution.

SUMMARY OF THE INVENTION

A system for securing irregularly shaped objects, including those with discontinuous contours, that may be bulky, heavy, or both, is provided. Additionally, a method of use and method of manufacture of the system is detailed. A preferred embodiment of the present invention provides a device for holding, stabilizing, and rotating an irregularly shaped object, including one with a discontinuous contour, in a cradle designed for holding, stabilizing, and rotating a regularly-shaped object such as a cylinder.

Provided as a component of a preferred embodiment is an insert or adapter for a fixture, preferably an equipment-handling cradle. Nominally incorporated as standard parts of a fitting that comprises a preferred embodiment of the present invention is at least one pair of structural elements that make up an insert or adapter. These two structural elements of the pair are secured together with at least one "quick release" fastener when the cradle is fitted with its intended irregularly shaped object. Specifically, the component has:

- at least one two-piece member, nominally an upper portion and a lower portion, cut to snugly fit the inside contour of the cradle's structural element(s) and the outside contour of the irregularly-shaped object to be stabilized securely in the cradle by the two-piece member;
- at least one "quick-release" connector for securing the two portions comprising the two-piece member; and
- an outside contour optimizing the use of holding elements of an existing fixture. (Holding elements may consist of at least one flexible strap with a ratcheting tightening means.)

Advantages of preferred embodiments, include permitting:

- simplified testing by using COTS hardware as the basic holding fixture;
- simplified maintenance on objects having an irregular configuration;
- inexpensive fixtures that use inserts or adapters fitting standard COTS cradles;
- improved safety by providing a simple, inexpensive, stabilizing holding fixture manufacturing of necessary inserts or adapters on site if need be;
- reduced man-hours for maintenance and testing;
- reduced tooling complexity;
- reduced tooling inventory;
- reduced tooling capital costs;
- lower maintenance costs through improved productivity;
- increased flexibility;
- high reliability; and
- ready upgradability.

Embodiments of the present invention can be applied to international weapons, such as:

- Beyond Visual Range Air to Air Missile (BVRAAM) (Matra Bae Dynamics Ltd, France)
- AA-6 Acrid (Russia)
- Anti-Navire Nouvelle Generation (ANNG) (Aerospatiale, France)
- Armiger (Bodenseewerk Geraetetechnik GmbH, Germany)
- TAURUS (Lenkflugkörpersysteme GmbH and Bofors)
- New Anti-Ship Missile (NSM) (Kongsberg and Aerospatiale)
- 3M54 and ASM-MS Alfa (Russia)
- Kh-65SE/Ks-SD (Russia)
- Modular/Multi-Purpose Stand Off Weapon (MUDSOW) H2/H3 (South Africa)

ASPM (Aerospatiale)

Arme Propulsee A Charges Ejectables Submunitions Dispenser Systeme (APACHE) (Aerospactiale, and Thompson-CSF)

Kh-31 KRYPTON (Zvezda-Strela, Russia)

Autonomous Free-Flight Dispenser System (AFDS) (LenkflugkÖrpersysteme GmbH, Germany)

Skyshark (Consorzio Armamenti Spendibili Multi Uso, Italy)

BVRAAM (Raytheon)

Air Intercept Missile (AIM) (Raytheon)

Joint Air-to-Surface Standoff Missile (JASSM) (Lockheed-Martin)

Stand-off Land Attack Missile-Extended Response (SLAE-ER) (Boeing)

Joint Stand-Off Weapon (JSOW) (Raytheon)

as well as numerous domestic and international aircraft-mounted gun pods.

Employment of a preferred embodiment of the present invention saves capital equipment, as well as training and maintenance, costs. Further, a preferred embodiment of the present invention may be used as inserts or adapters for commercially available units thus providing a ready source of base fixtures for adapting to any future holding requirements.

Preferred embodiments are fully disclosed below, albeit without placing limitations thereon.

DETAILED DESCRIPTION

A system for securing irregularly shaped objects, including those objects with discontinuous contours, an example of which may be bulky, heavy, or both, is provided. Additionally, a method of use and a method of manufacture of a preferred embodiment of the present invention are detailed.

Figure 1B:
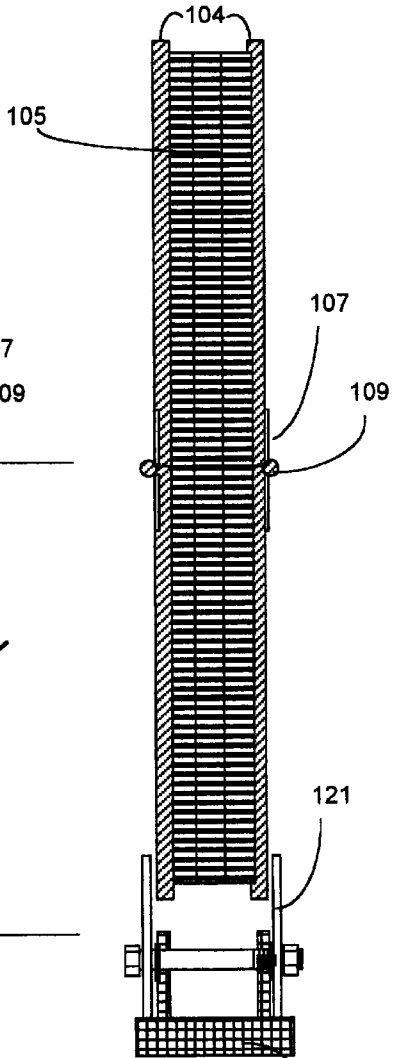
FIG. 1B is an edge view of a preferred embodiment of the present invention as installed in a cradle for handling large cylindrical objects, such as missiles.
Figure 1A:
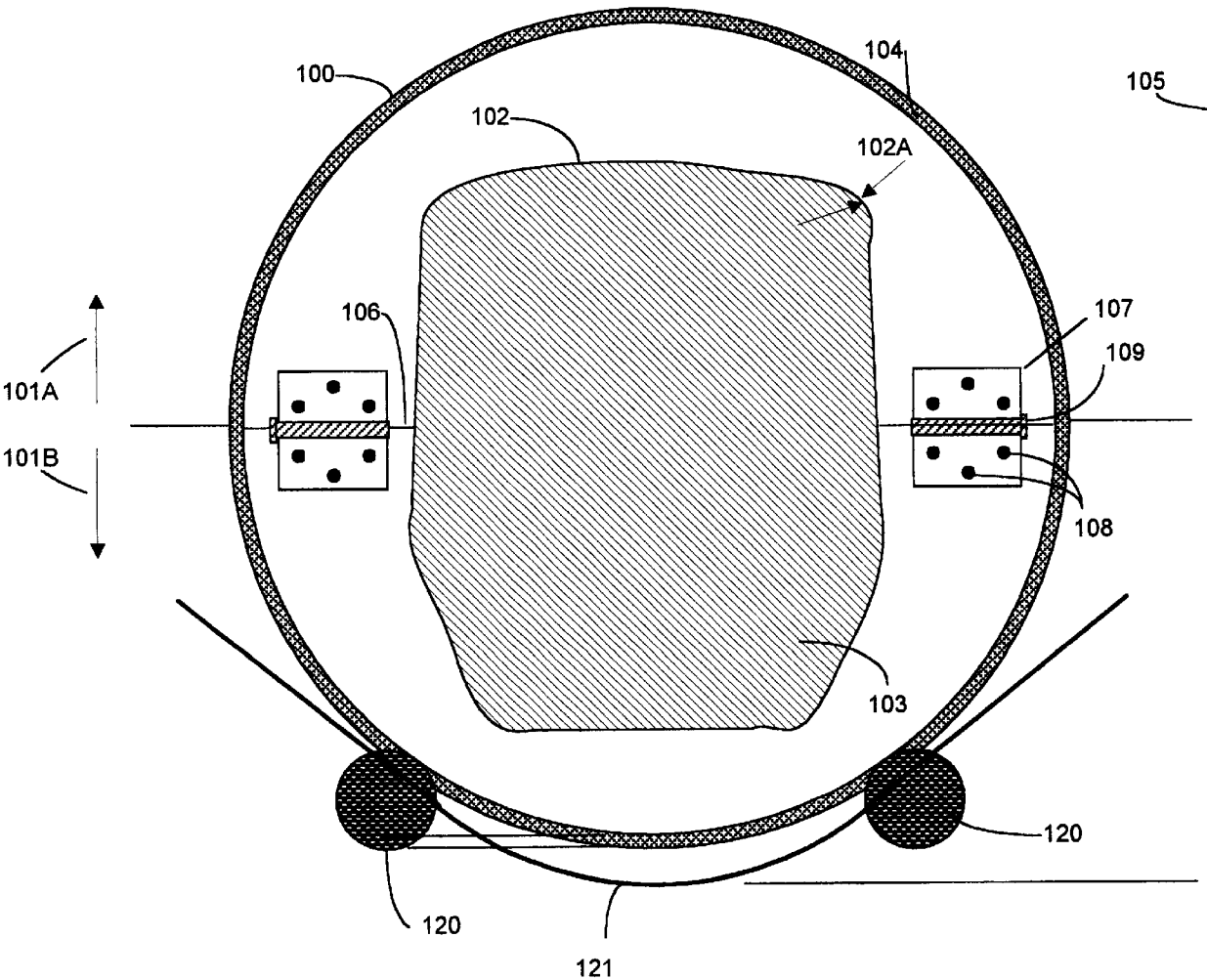
FIG. 1A is an end view of a preferred embodiment of the present invention as installed in a cradle for supporting large cylindrical objects, such as missiles.
Figure 2:
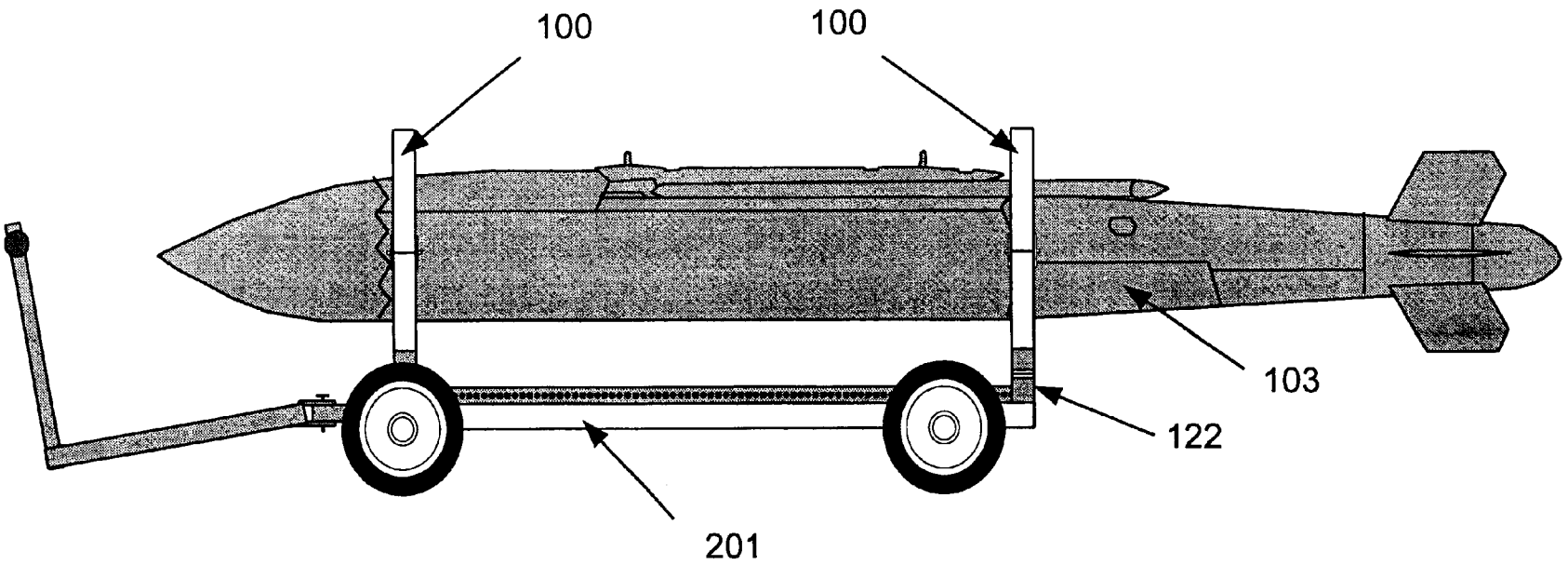
FIG. 2 is a side view of an irregularly-shaped object as installed in a standard cradle with inserts that comprise a preferred embodiment of the system of the present invention.
Figure 6:
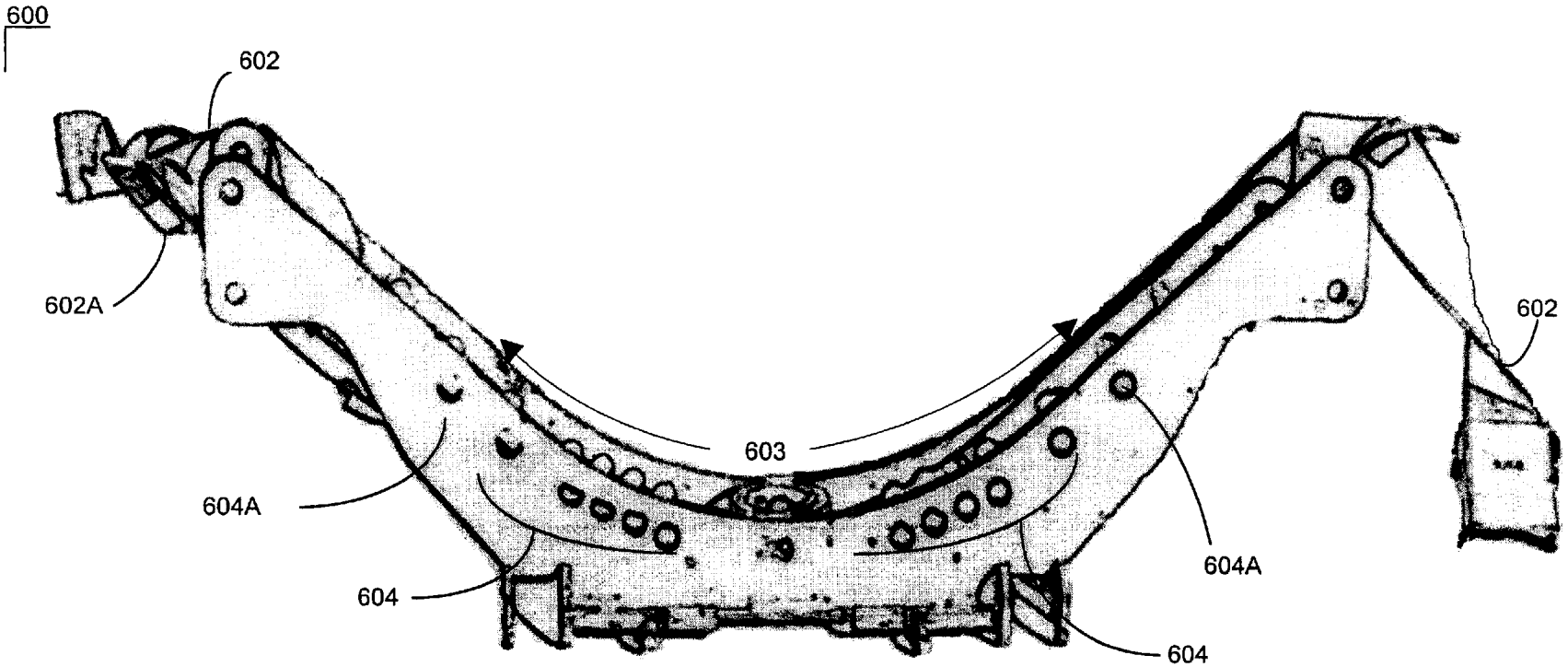
FIG. 6 depicts the standard cradle used in the modified fixture of FIGS. 3, 4 and 5.
Figure 7:
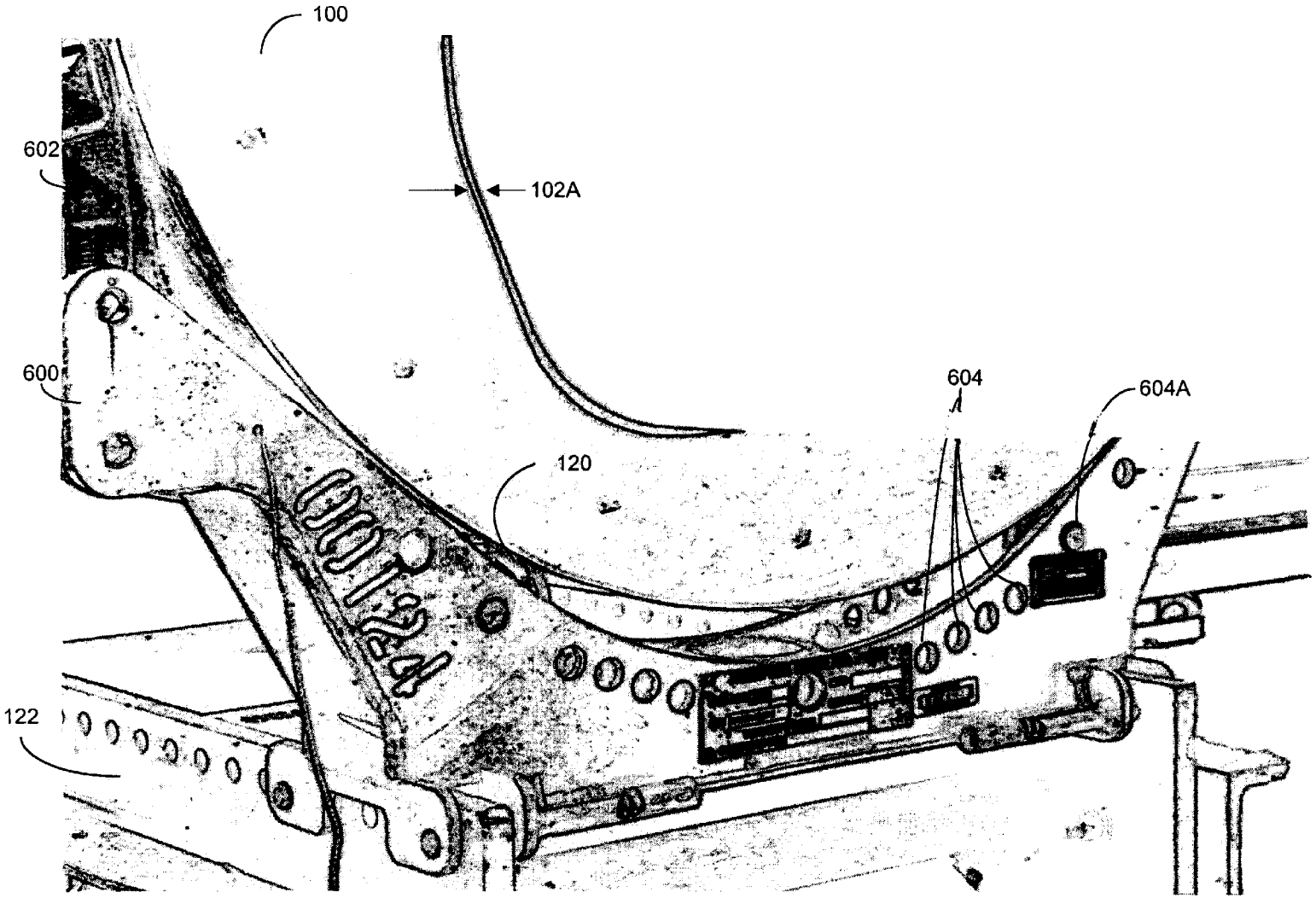
FIG. 7 is a close-up view of the bottom half of a single component of a preferred embodiment of the present invention while resting in the standard cradle of FIG. 6.

Referring to FIG. 1, provided as a component of a preferred embodiment is an insert 100 for a fixture 121, preferably an adjustable equipment-handling cradle 601 as shown in FIG. 6. Nominally incorporated as a standard fitting is at least one pair of structural elements 101A and 101B that are secured together to comprise an insert or adapter 100 with a "quick release" fastener 109 when the cradle 601 (or fixture 121) is fitted with its intended load (shown as a cross-section end represented by the cross-hatched area 103 of FIG. 1), having:

at least one two-piece member 100, nominally an upper portion 101A and a lower portion 101B, cut to snugly fit the inside contour of the fixture's structure 121, optionally connected to a holding or transporter device 122, and the outside contour 102 of the irregularly-shaped object 103 to be stabilized securely in the fixture 121 by the at least one two-piece member 100, as secured using at least one "quick-release" connector 109 for securing the two portions 101A and 101B comprising the two-piece member 100; and having an external contour 105 optimizing the use of holding elements (not separately shown in FIG. 1, but shown as straps 602 in FIG. 6 ) of an existing fixture 121. Holding elements may consist of at least one flexible strap 602 with a ratcheting tightening means 602A. Further, the outside contour may be de-limited by "lips" 104 that serve to ensure the holding elements, e.g., straps 602, do not slide off the insert or adapter 100 during use.

A preferred embodiment of the present invention may be built as described below. The description in no way limits the manner in which a preferred embodiment of the present invention may be carried out, simply serving as an example of one method, many of which will be known to one of ordinary skill in the art.

Figure 8:
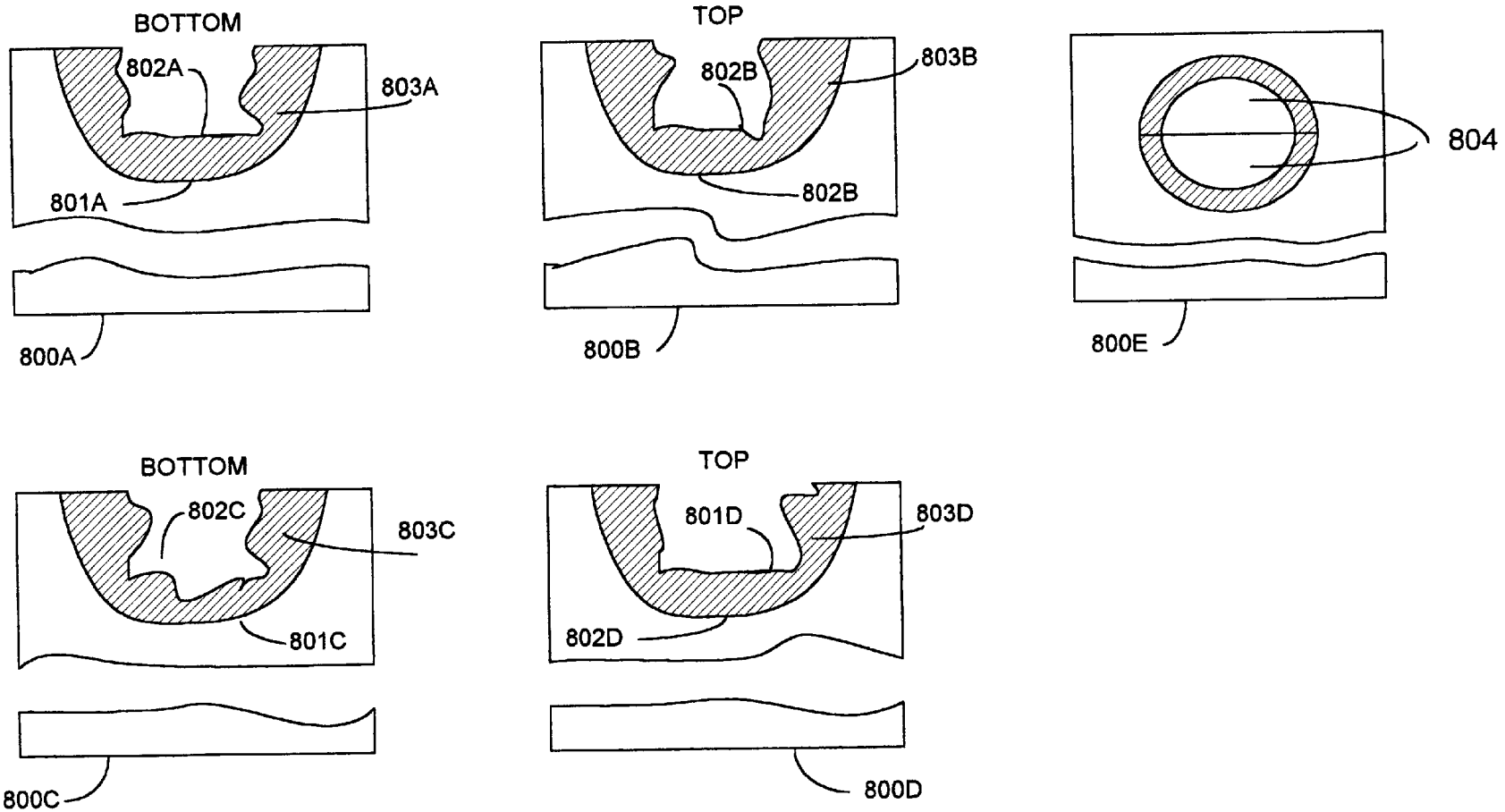
FIG. 8 depicts the cuts made in a standard piece of plywood for fabricating an insert to be used in a preferred embodiment of the present invention.

Refer to FIG. 8. A piece of plywood 800A, of suitable strength for the intended load, is scribed and a piece 803A cut out so that the piece's external dimension 801A snugly fits the inside dimensions of a fixture 121 for holding regularly-shaped objects, e.g., the adjustable cradle 601 of FIG. 6, and its internal dimension 802A snugly fits the outside contour of a first portion, shown in FIG. 1 as the top part 101A, of an irregularly-shaped object to be secured in the fixture 121. The contour 102 of the irregularly shaped object may be taken using lead tape such as used in weighting golf clubs and then transferred to the plywood 800A. The simplest example is the cradle 601 of FIG. 6 with an inside contour 603 tracing a semi-circle, and adjustable within limits, to support cylinders of varying diameters. For example, in the case of the adjustable cradle 601, rotating balls 120 may be placed at varying locations 604 along the cradle's 601 perimeter, insuring symmetry by placing the rotating balls 120 in pairs at corresponding pre-determined positions. In cases where the object is heavy and is to be rotated in the fixture 121 for easy access to its various parts, it is desirable to provide a system for securing the irregularly shaped object during rotation. Using the adjustable cradle 601 as an example, a second piece of plywood 800B of suitable strength is scribed and a piece 803B cut similar to the first piece 803A and is snugly fit to a second portion of the irregularly-shaped object, e.g., a portion tracing the bottom part 101B of the contour 101 of FIG. 1. Note also, that the sections comprising the insert do not have to be exact halves, but can be cut to join at locations along the object's long axis that would necessitate unequal sections so as to be convenient for user access. Compare the aft insert 401A of FIG. 4 to the forward insert 401B, for example.

For the example of a cradle 601 having an inside dimension 603 suitable for receiving objects having circular outer dimensions of varying diameters, the first and second pieces of plywood 800A and 800B are cut so that the two pieces 803A and 803B will meet along a chord or a diameter 106. Note that the diameter of COTS cradles may be adjusted, within limits, so that a cylindrical object just fits the cradle's 601 inside dimension 603. For example, adjustment may be accomplished by proper symmetrical placement of a pair of rotating balls 120 in one of the cradle's 601 pre-determined locations 604. The inner contours 702A and 702B of the two pieces of plywood 703A and 703B snugly fit the complete outer contour 102 of the irregularly-shaped object 103 at the location along an axis, most likely a long axis, of the irregularly-shaped object that is to be secured in a standard fixture 121, in the example, the cradle 601 of FIG. 6. Alternatively, the inside contour 102 of the "insert" may be lined with felt 102A, or a similar non-abrasive material, to prevent scuffing or marring the irregularly shaped object 103.

In those cases where the irregularly-shaped object is heavy, a second set of two pieces of plywood 800C, a counterpart to piece 800A, and 800D, a counterpart to piece 800B, are scribed and cut as above, yielding pieces 803C and 803D, respectively. The inside contours 802C and 802D of this second set 803C and 803D may be different from that of the contours 802A and 802B of the first two pieces 803A and 803B because the location of this second set 803C and 803D will be offset along the axis of the irregularly-shaped object 103 by a small amount as determined in the next step.

Figure 3:
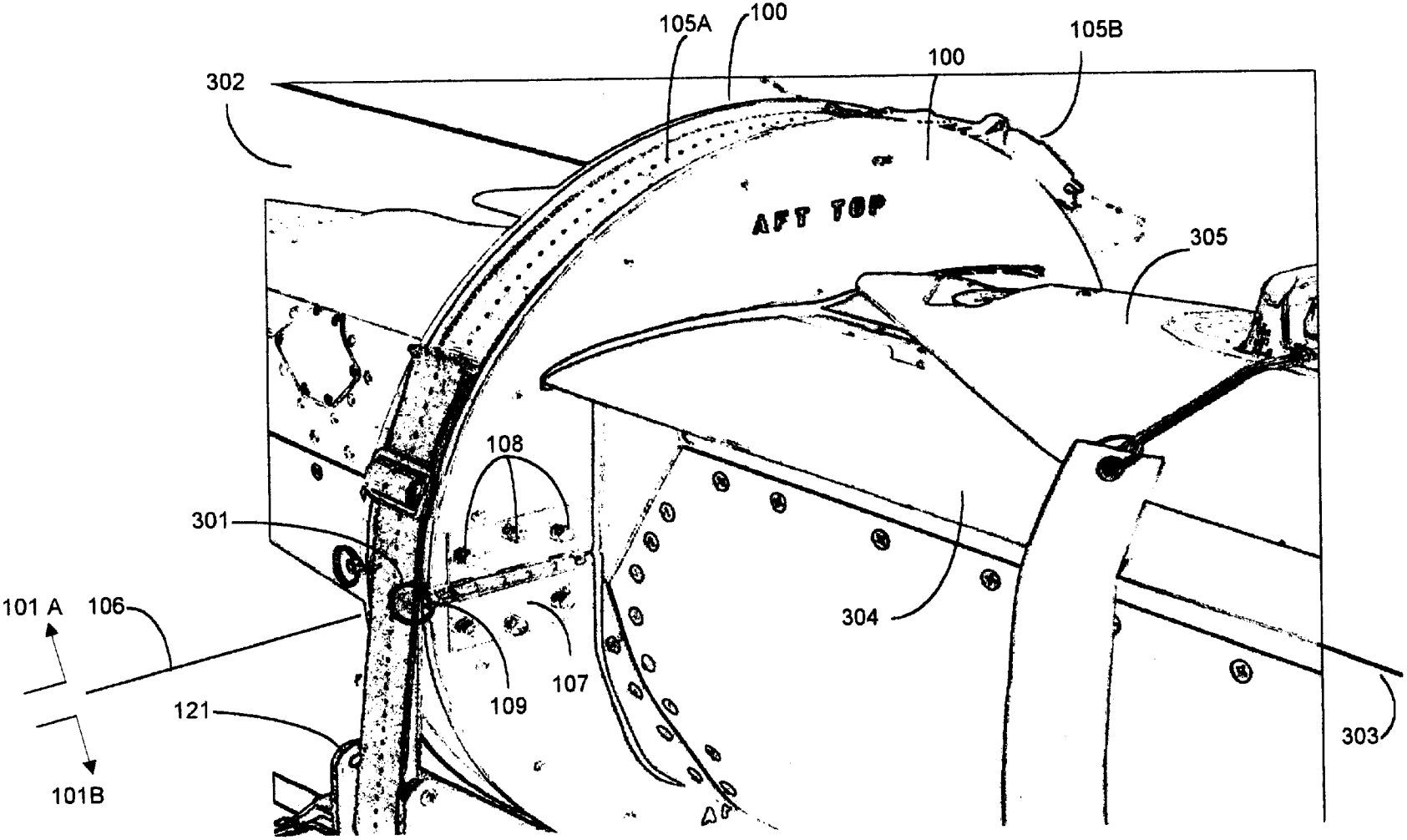
FIG. 3 represents a single component of a preferred embodiment of the present invention, as affixed to a standard cradle thus enabling the secure rotation of an irregularly shaped object.

Two pieces of plywood 804, of a thickness suitable for forming a "lip" around the outer dimension of the insert are cut with a diameter slightly longer than the insert, nominally 1" longer, from another piece of plywood 800E to serve as a guide element along the support surface 105, thus positioning a holding element such as a strap 602. These are suitably affixed along the outer circumference 801A and 801B of pieces 803A and 803B, respectively, forming the lip 104 along one side. This configuration is then attached to the counterpart pieces 803C and 803D, respectively, using screws and glue, for example, thus completing a single two piece adapter or insert 100 with lip 104. That is, these two pieces 804 join the two thicker flat pieces in making the upper section 101A comprising pieces 803A, 803C and 704, and in making the lower section 101B, comprising pieces 803B, 803D, and 704. The final step involves attaching suitable hinges 107 using through bolts 108 along the abutting portions of sections of 101A and 101B front and back and joining these hinge parts with "quick release" pins 109, facilitating the loading and unloading of specific irregularly-shaped objects 103. These hinges 107 are provided one on each side of each half of the insert 100 as viewed from one end of the long axis of the irregularly-shaped object 103, and include corresponding hinges 107 on the "backs" (not observable when viewed end-on as in FIG. 1), the "back" hinges 107 connected by through-bolting with bolts 108 (of sufficient strength to meet load requirements) to the "front" hinges 107. Each of the four "quick release" pins 109 per insert 100 may be provided with safety wires 301A of FIG. 3, for example, to prevent inadvertent release of the irregularly shaped object 103.

Figure 5:
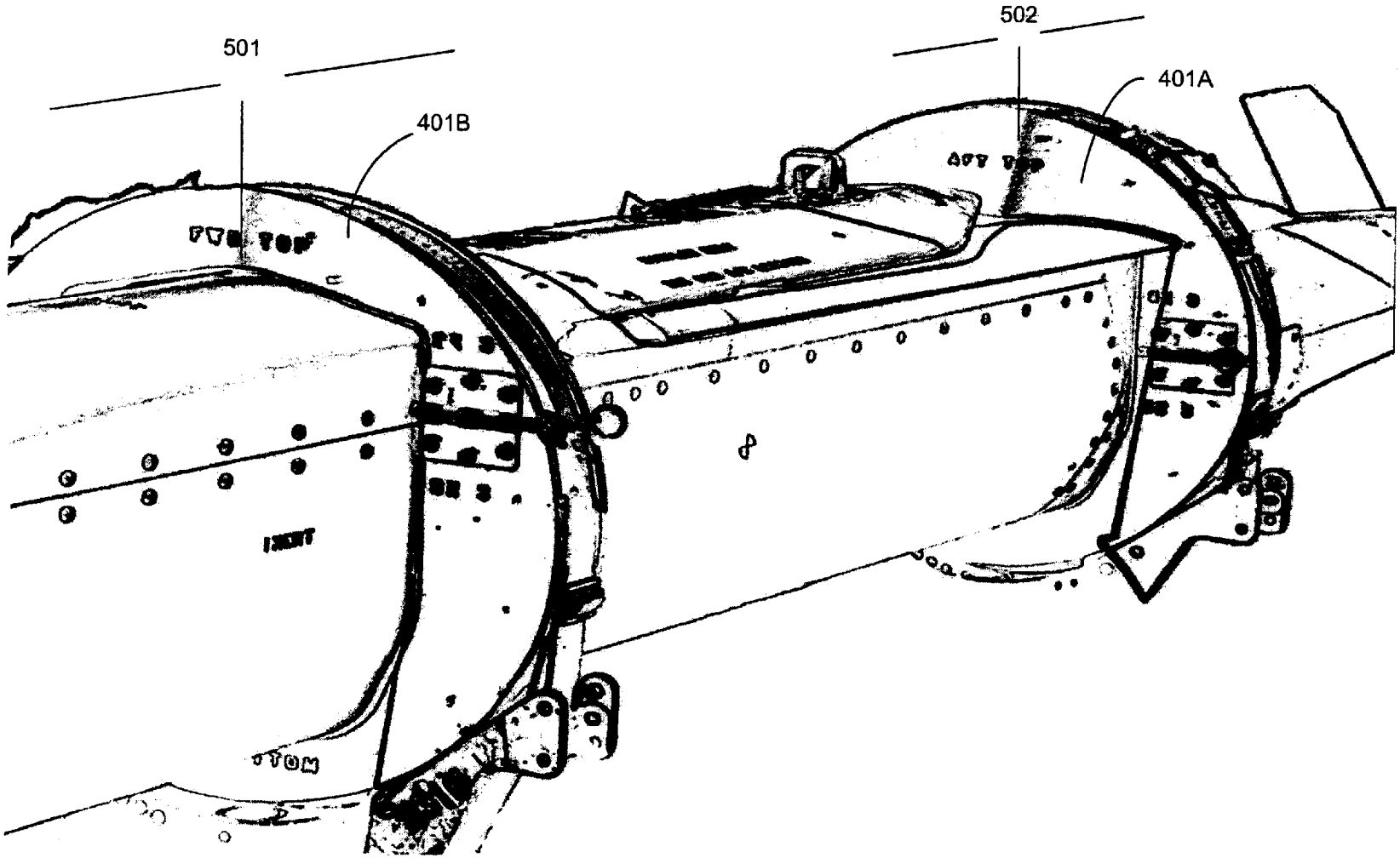
FIG. 5 represents two inserts used in a preferred embodiment of the present invention. as affixed to a standard cradle when viewed from the front end of the irregularly shaped object loaded in the fixture.

For production lots, suitable means for molding a material, such as fiberglass or a resinous material, into the required contours can be effected to yield the same result. That is, an "adapter" or "insert" is formed for holding a specific irregularly-shaped (or contoured) object at a specific location, or locations, along an axis of an irregularly-shaped object, for example, its long axis, thus permitting secure rotation of the irregularly-shaped object 103 in a standard fixture 121 originally designed for securing only regularly-shaped objects. These adapters may be placed at multiple locations along an axis of the irregularly shaped object 103 as depicted in FIG. 5 at two locations 501 and 502.

EXAMPLE

Figure 4:
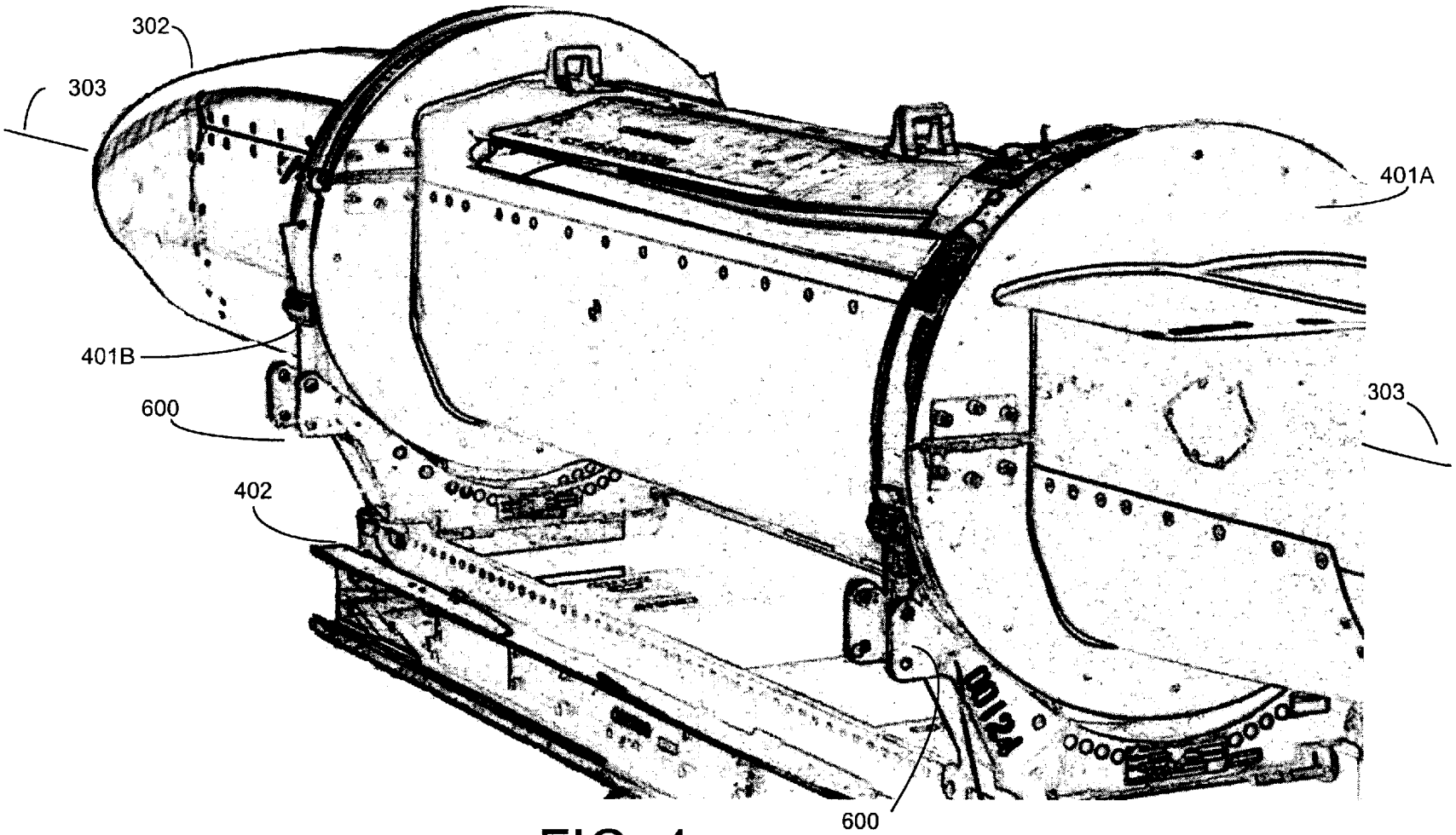
FIG. 4 represents two inserts used in a preferred embodiment of the present invention as affixed to a standard cradle when viewed from the aft end of an irregularly-shaped object loaded in the fixture.

A preferred embodiment of the present invention, locally known as the "JSOW Rollover Fixture," a composite of components 401A, 401B, 402 and 600, is depicted on end as the apparatus 100 of FIG. 1 and in plan view supporting the JSOW in two places, using inserts 401A and 401B, along its long axis 303 as in FIG. 4. It incorporates a pair of fixture inserts or adapters 401A and 401B that permit rotation of the AGM-154 (JSOW) weapon 302, thus providing direct access to the onboard Test Instrumentation Kit (TIK) (not separately shown). The JSOW weapon 302 is heavy, bulky, irregularly shaped, and also discontinuous in contour in places along the contour of its long axis 303. There are two parts to the interface 101A and 101B with the roller balls 120 of two AERO-58A Skid Adapters 600, shown in FIG. 6 with roller balls 120 set on maximum spacing 604A, in turn mounting to an MHU-191M Munitions Transporter 402 in FIG. 4.

The JSOW Rollover Fixture 401A, 401B, 402 and 600 is a non-lifting, non-powered system that adapts the AGM-154 302 to the AERO-58A skid adapters 600 to allow the AGM-154 302 to be rotated for safe access to the flight termination system. A preferred embodiment of the present invention as applicable to the JSOW munition of this example, is implemented as described below.

To secure the JSOW munition 302 in the modified fixture, the following steps are followed, assuming two fixture inserts 401A and 401B, one aft 401A and one forward 401B (as associated with a correlated aft and forward skid adapter AERO-58A 600), the inserts 401A and 401B to be identical in function but most likely having differing inner contours 102:

1. Position the forward AERO-58A skid adapter 600 in the most forward hole position (not separately shown) on the MHU-191/M 402. Move the roller balls 120 of the AERO-58A 600 to the outermost (#6) positions 604A. Release the nylon restraining strap 602 and remove the strap 602 from the roller ball area.
2. Position the aft AERO-58A skid adapter 600 in the most aft hole position (not separately shown) on the MHU-191/M 402. Move the roller balls 120 of the AERO-58A 600 to the outermost (#6) positions 604A. Release the nylon restraining strap 602 and remove the strap 602 from the roller area.
3. Remove four (4) pins 109 from the hinges 107 of the forward JSOW Rollover Fixture insert 401B, and place the bottom half 101B onto the roller balls 120 of the forward AERO-58A 600. Place the top half 101A and the pins 109 near the forward end of the MHU-191/M 402.
4. Remove four (4) pins 109 from the hinges 107 of the aft JSOW Rollover Fixture insert 401A, and place the bottom half 101B onto the roller balls 120 of the aft AERO-58A 600. Place the top half 101A onto the AGM-154 302 just aft of the folded wings 304, and slide the top half 101A forward (encasing the wings 304) to the aft end of the AGM-154 302 wing cover 305.

5. Lower the AGM-154 302 into the lower halves 101B of the fixture inserts 100, positioning the weapon 302 such that the aft top half 101A aligns with its corresponding bottom half 101B. Install four (4) pins 109 into the aft fixture hinges 107.
6. Place the top half 101A of the forward fixture insert 401B onto the AGM-154 302, aligning with its corresponding bottom half 101B. Install four (4) pins 109 into the forward fixture hinges 107.
7. Remove the hoisting equipment (not separately shown) from the AGM-154 302.
8. Invert the AGM-154 302 by rotating it in its cradles 600.
9. To gain access to the Test Instrumentation Kit (TIK) panel, remove four (4) pins 109 from the aft fixture insert 401A and remove the corresponding bottom half 101B of the aft fixture insert 401A.
10. Reverse the above procedure to return the AGM-154 302 to its upright position.

The above descriptions should not be construed as limiting the scope of the invention but as mere illustrations of preferred embodiments. For example, although examples discussed at length are airborne weapons and standard fixtures for holding cylindrical objects such as missiles, the method and apparatus is applicable to any shape, contour, or size that a user may need to secure. Specifically, a single insert or adapter (as opposed to the dual inserts of the above example) in keeping with the design of a preferred embodiment of the present invention may be all that is required when combined with compressible spring-loaded pins such as may be used with the '272 and '618 patents and a schnabel arrangement such as frequently used on railways or docks. Additionally, a single removable "quick release" pin per insert may suffice where alternatives to standard hinges are used. Further, although the above example was for a bulky and heavy object, the physical size, mass and shape of the irregularly-shaped object to be supported by an application of the present invention is immaterial. For example, a preferred embodiment of the present invention may be suitable for securing devices at the micron or nanometer scale. The scope shall be determined by appended claims as interpreted in light of the above specification.

I claim:

1. A system, having an inner and outer contour, for securing an irregularly shaped object, comprising:

at least one fixture, having inside and outside contours, incorporating an axis suitable for rotation thereabout;

an adapter having an insert, said insert incorporating at least two parts and having an outside contour shaped to closely fit the inside contour of said fixture and an inside dimension that closely fits the outside contour of the irregularly-shaped object to be supported in said fixture and wherein said insert permits the irregularly shaped object to be secured and rotated about the axis suitable for rotation thereabout in a fixture that otherwise supports only an object having a regular specific outer contour;

at least one cradle, having an inner and outer contour, as part of said fixture, wherein said insert is fitted to said cradle so as to hold the irregularly-shaped object while said irregularly-shaped object is being rotated about said axis suitable for rotation thereabout, said insert having said insert's outer contour snugly fitting said inner contour of said cradle and said insert's inner contour snugly fitting the outer contour of the irregularly-shaped object in at least one location along said axis suitable for rotation thereabout; and at least one quick release connector in operable communication with each of said at least two parts of said insert, wherein, the system permits the irregularly shaped object to be secured for rotation about said axis suitable for rotation thereabout.

2. The system of claim 1 wherein said at least one cradle is adjustable.

3. The system of claim 1 employing a transporting device as part of said fixture, wherein said transporting device supports said at least one cradle along at least a portion of said cradle's outer contour.

4. The system of claim 1 incorporating at least one hinge, operable through a removable bolt, as said at least one quick release connector, wherein said removable bolt optionally incorporates a safety wire.

5. The system of claim 1 wherein said outside contour of said insert is shaped to snugly fit said fixture's inner contour and said inner dimension of said insert is shaped to snugly fit the outer contour of the irregularly-shaped object to be supported in said fixture, wherein, said insert permits the irregularly shaped object to be secured and rotated about the axis suitable for rotation thereabout in a fixture that otherwise supports only an object having a regular specified outer contour; and wherein said insert is easily separable into at least two component parts thus facilitating access to any section of the irregularly-shaped object while the irregularly-shaped object is secured in said fixture.

6. The system of claim 1 wherein said insert further comprises a non-abrasive material deployed over the inner contour of said insert, said non-abrasive material selected from the group consisting of: a natural felt, a foam, a manmade fabric, a coating initially applied in liquid form, and material suitable for isolating physical vibration.

* * * * *